US010852696B2

(12) United States Patent
Domenes et al.

(10) Patent No.: US 10,852,696 B2
(45) Date of Patent: Dec. 1, 2020

(54) DEVICE AND METHOD ALLOWING OBSERVATION OF AN OBJECT WITH A LARGE FIELD OF OBSERVATION WITHOUT USE OF MAGNIFYING OPTICS BETWEEN A LIGHT SOURCE AND THE OBJECT

(71) Applicants: COMMISSARIAT A L'ENERGIE ATOMIQUE ET AUX ENERGIES ALTERNATIVES, Paris (FR); BIOMERIEUX, Marcy-l'Etoile (FR)

(72) Inventors: Mickael Domenes, Voreppe (FR); Quentin Josso, Lyons (FR); Francois Perraut, Saint Joseph de Riviere (FR)

(73) Assignees: COMMISSARIAT A L'ENERGIE ATOMIQUE ET AUX ENERGIES ALTERNATIVES, Paris (FR); BIOMERIEUX, Marcy-l'Etoile (FR)

(*) Notice: Subject to any disclaimer, the term of this patent is extended or adjusted under 35 U.S.C. 154(b) by 31 days.

(21) Appl. No.: 15/772,563

(22) PCT Filed: Nov. 3, 2016

(86) PCT No.: PCT/FR2016/052846
§ 371 (c)(1),
(2) Date: May 1, 2018

(87) PCT Pub. No.: WO2017/077238
PCT Pub. Date: May 11, 2017

(65) Prior Publication Data
US 2019/0120747 A1 Apr. 25, 2019

(30) Foreign Application Priority Data
Nov. 4, 2015 (FR) ..................... 15 60587

(51) Int. Cl.
*G03H 1/04* (2006.01)
*G01N 15/14* (2006.01)
(Continued)

(52) U.S. Cl.
CPC .......... *G03H 1/0465* (2013.01); *G01N 15/00* (2013.01); *G01N 15/1434* (2013.01);
(Continued)

(58) Field of Classification Search
CPC .... G02B 21/361; G03H 1/0465; G03H 1/041; G03H 1/0443; G03H 1/0866;
(Continued)

(56) References Cited

U.S. PATENT DOCUMENTS 6,532,067 B1 * 3/2003 Chang .................. G01N 21/64
250/461.1
9,395,293 B1 * 7/2016 Acosta ................. G01N 21/255
(Continued)

FOREIGN PATENT DOCUMENTS

EP 2 592 459 A1 5/2013
WO WO 2014/184390 A1 11/2014

OTHER PUBLICATIONS

International Search Report dated Feb. 27, 2017 in PCT/FR2016/052846 filed Nov. 3, 2016.

*Primary Examiner* — Michael P LaPage
(74) *Attorney, Agent, or Firm* — Oblon, McClelland, Maier & Neustadt, L.L.P.

(57) ABSTRACT

A device and a method for observing an object by imaging, or by lensless imaging. The object is retained by a holder defining an object plane inserted between a light source and an image sensor, with no enlargement optics being placed between the object and the image sensor. An optical system is arranged between the light source and the holder and is configured to form a convergent incident wave from a light (Continued)

wave emitted by the light source, and for forming a secondary light source, conjugated with the light source, positioned in a half-space defined by the object plane and including the image sensor, such that the secondary source is closer to the image sensor than to the holder. This results in an image with a transversal enlargement factor having an absolute value of less than 1.

18 Claims, 5 Drawing Sheets

(51) Int. Cl.
| | | |
|---|---|---|
| *G01N 15/00* | (2006.01) | |
| *G01N 21/45* | (2006.01) | |
| *G01N 21/47* | (2006.01) | |
| *G03H 1/08* | (2006.01) | |
| *G01N 15/10* | (2006.01) | |

(52) U.S. Cl.
CPC ....... *G01N 15/1468* (2013.01); *G01N 21/453* (2013.01); *G01N 21/4788* (2013.01); *G03H 1/041* (2013.01); *G03H 1/0443* (2013.01); *G03H 1/0866* (2013.01); *G01N 2015/1006* (2013.01); *G01N 2015/1454* (2013.01); *G03H 2001/0447* (2013.01); *G03H 2001/0452* (2013.01); *G03H 2001/0471* (2013.01); *G03H 2222/43* (2013.01); *G03H 2222/44* (2013.01); *G03H 2222/54* (2013.01)

(58) Field of Classification Search
CPC ........... G03H 2223/23; G03H 2223/16; G03H 2222/43; G03H 2222/12; G03H 2001/0471; G03H 2001/0452; G03H 2222/54; G03H 2222/44; G03H 2001/0447; G01N 15/1434; G01N 15/1468; G01N 21/4788; G01N 21/453; G01N 15/00; G01N 2015/1006; G01N 2015/1454
See application file for complete search history.

(56) References Cited

U.S. PATENT DOCUMENTS

| | | | |
|---|---|---|---|
| 2006/0078113 A1* | 4/2006 | Javidi | G03H 1/0866 380/210 |
| 2008/0258058 A1* | 10/2008 | Harada | G01N 23/00 250/310 |
| 2012/0178425 A1* | 7/2012 | Gisby | H04M 3/4234 455/413 |
| 2013/0100241 A1 | 4/2013 | Sato | |
| 2013/0310270 A1* | 11/2013 | Colle | G01N 33/54326 506/9 |
| 2015/0362713 A1* | 12/2015 | Betzig | G02B 21/0064 250/459.1 |
| 2016/0041094 A1 | 2/2016 | Lei | |
| 2016/0103064 A1 | 4/2016 | Marcoux et al. | |
| 2017/0146789 A1* | 5/2017 | Lansel | G02B 21/367 |
| 2018/0011309 A1* | 1/2018 | Andresen | G02B 6/06 |
| 2018/0284418 A1* | 10/2018 | Cohen | G02B 3/0006 |

\* cited by examiner

DEVICE AND METHOD ALLOWING OBSERVATION OF AN OBJECT WITH A LARGE FIELD OF OBSERVATION WITHOUT USE OF MAGNIFYING OPTICS BETWEEN A LIGHT SOURCE AND THE OBJECT

TECHNICAL FIELD

The technical field of the invention is imaging and in particular lensless imaging, a technique allowing an object placed facing an image sensor to be observed without magnifying optics placed between the object and the sensor. The object may in particular be a biological sample.

PRIOR ART

The observation of objects, for example biological samples, by lensless imaging has seen substantial development over about the last ten years. This technique allows an object to be observed by placing it between a light source and a matrix-array image sensor, without having to place magnifying optical lenses between the object and the image sensor. Thus, the image sensor collects an image of the light wave transmitted by the object.

This image is formed from interference patterns between a light wave emitted by the source then transmitted by the sample, and diffraction waves that result from diffraction, by the sample, of the light wave emitted by the source. These interference patterns are sometimes referred to as diffraction patterns.

The publication by Repetto L., "Lensless digital holographic microscope with light-emitting diode illumination", Optics Letters, May 2004, describes a device including an object placed between a CCD image sensor and a light source, namely a light-emitting diode. No magnifying optics are placed between the object and the image sensor. In the example described in this publication, the object comprises latex spheres. Under the effect of illumination by the light source, each sphere produces, in the image formed by the image sensor, a diffraction pattern.

Document WO2008090330 describes a device allowing biological samples, namely cells, to be observed by lensless imaging. The device allows an interference pattern the morphology of which allows the type of cell to be identified to be associated with each cell. Lensless imaging would therefore appear to be a simple, and inexpensive, alternative to a conventional microscope. In addition, it allows a field of observation to be obtained that is clearly much larger than that of a microscope. Thus it will be understood that there are many important potential applications of this technology.

Patent application EP2592459 describes a device for forming a hologram of an object, the object being illuminated by an incident light wave that is made convergent by a lens placed between a light source and the object.

Patent application WO2014184390 describes a device for forming a hologram representative of a bacterial colony. The bacterial colony is illuminated with a parallel laser beam. The size of the beam reaching the bacterial colony may vary depending on a distance with respect to a lens placed between a source of the laser beam and a holder on which the bacterial colony is placed.

In all of the aforementioned documents, the image of the object is acquired with a magnification higher than or equal to 1, depending on the position of the object with respect to the image sensor. Although the field of observation is satisfactory, certain applications require a larger field of observation. Moreover, it may be desirable to use a device the magnification of which may be varied. The invention meets these needs.

SUMMARY OF THE INVENTION

One subject of the invention is a device for observing an object, including:
  a light source that is able to generate a light wave, called the emission wave, that propagates along a propagation axis;
  an image sensor; and
  a holder that is placed between the image sensor and the light source and that is able to hold an object such that the image sensor is able to form an image of an object held on the holder;
the device being characterized in that it also includes:
  an optical system that is placed between the light source and the holder and that is able to form, from said emission wave, a convergent incident wave that propagates from said optical system to the holder.

Preferably, the device includes no magnifying optics between the holder and the image sensor.

The holder may in particular define a plane, called the object plane, that is perpendicular to the propagation axis and that passes through the holder, said optical system then being able to conjugate the light source with a secondary source that is located in a half space defined by the object plane and that includes the image sensor
  in other words in a half space that is defined by the object plane and that does not include the light source.

The optical system may be configured such that said secondary source is located:
  either between the holder and the image sensor;
  or in a half space that is defined by a detection plane in which plane the image sensor lies, and that does not include the light source, i.e. in other words that does not include the holder.

The optical system may be configured such that said secondary source is located closer to the image sensor than to the holder. Thus, the image of the object, held on the holder, on the image sensor, is affected by a transverse magnification lower than 1.

The optical system may be parameterized by a parameter, such that the position of said secondary source is adjustable depending on said parameter. This parameter may in particular be a position of the optical system along the propagation axis or a focal length of the optical system. This allows the transverse magnification of an image of the object, the latter being held by the holder, to be varied.

Another aspect of the invention is a method for observing an object including the following steps:
  a) placing the object between a light source and an image sensor, the light source being coupled to an optical system that is placed between the light source and the object, no magnifying optics preferably being placed between the object and the image sensor;
  b) activating the light source, the light source then emitting a light wave that is what is called an emission wave that propagates to the optical system, the latter forming a convergent incident light wave that propagates to the object; and
  c) acquiring, using the image sensor, an image of the object thus exposed to said convergent incident wave.

According to one embodiment, the emission wave is emitted along a propagation axis, the object defining a plane, called the object plane, that passes through the object and that is perpendicular to said propagation axis; in step b), said optical system then conjugates the light source with what is called a secondary light source, the latter being located in a half space that is defined by said object plane and that includes the image sensor—in other words in a half space that is defined by the object plane and that does not include the light source.

The secondary light source may thus be located:
either between the object and the image sensor;
or in a half space that is defined by a detection plane in which the image sensor lies, and that does not include the light source (or that does not include the holder).

The method may include a step of adjusting the position of said secondary source depending on a parameter of the optical system. This parameter may be:
a focal length of said optical system; or
a position of said optical system along said propagation axis.

In step c), the image sensor may be exposed to what is called an exposure wave including:
a wave that is transmitted by the object and that results from the transmission, by the object, of the convergent incident wave; and
a diffraction wave that results from the diffraction, by the object, of the convergent incident wave.

The light source emitting the emission light wave at a wavelength, the object is preferably translucent or transparent with respect to said wavelength. For example, the object includes particles that are dispersed in or on the surface of a medium, the latter being translucent or transparent to said wavelength.

The method may include a step d) of applying a holographic reconstruction algorithm to all or some of the image formed on the image sensor of the object. This in particular allows a reconstructed image to be obtained in what is called a reconstruction plane, which lies parallel to the detection plane.

The method may in particular be implemented using a device such as described in this patent application, the main features of which have been indicated above.

The invention will be better understood from the following detailed description, which is based on nonlimiting embodiments, which are illustrated by the figures listed below.

FIGURES

Figure 5A:
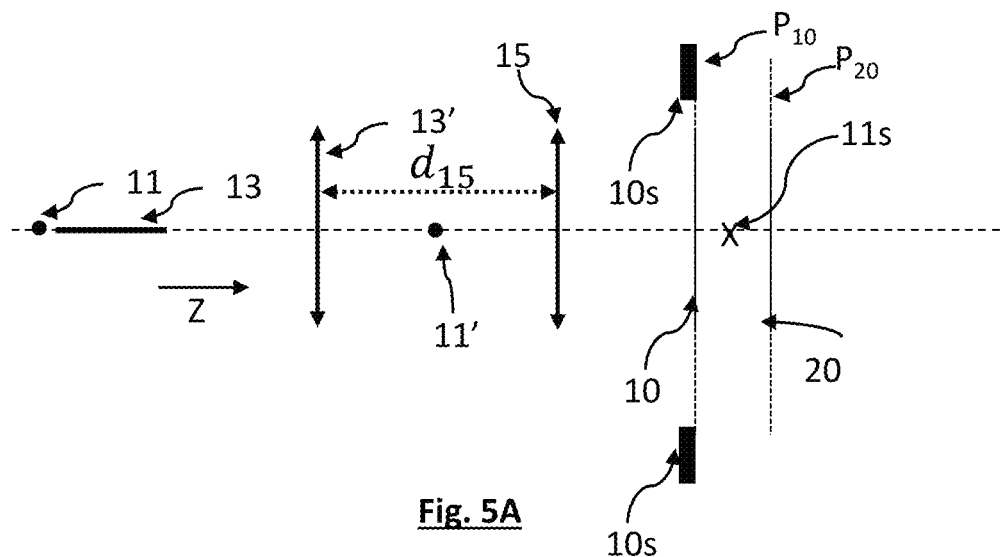
Figure 5B:
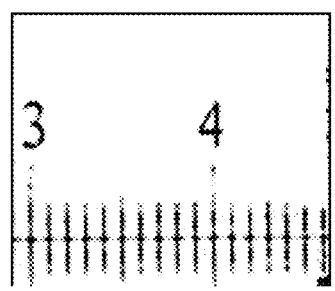
Figure 5C:
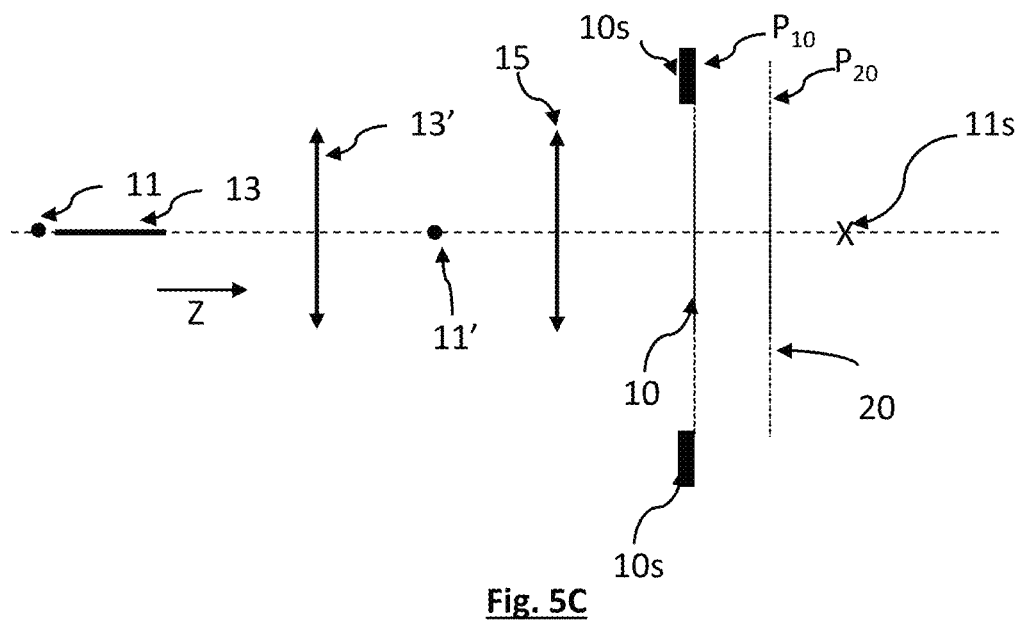

FIG. 5A shows an experimental device. FIG. 5B shows a detailed view of a reticle used in this device. FIG. 5C shows another experimental device.

Figure 6A:
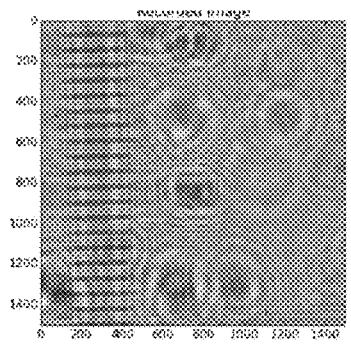
Figure 6B:
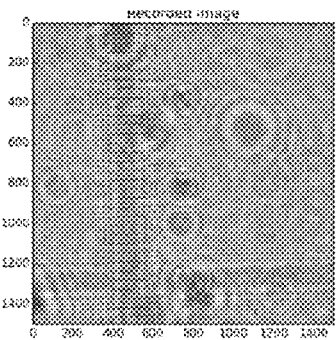
Figure 6C:
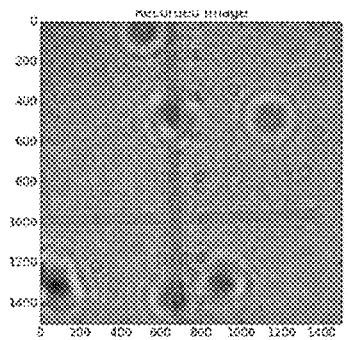

FIGS. 6A, 6B and 6C illustrate images acquired using the experimental device shown in FIG. 5A.

Figure 7A:
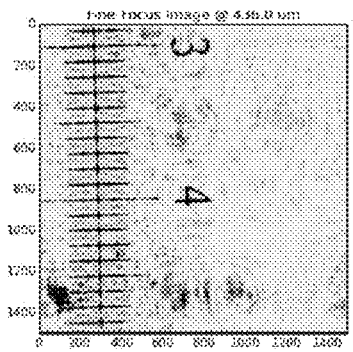
Figure 7B:
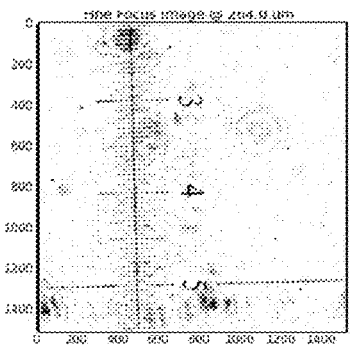
Figure 7C:
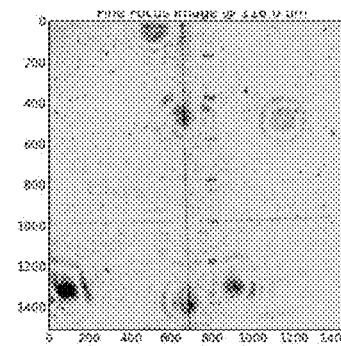

FIGS. 7A, 7B and 7C show images obtained by holographic reconstruction, on the basis of FIGS. 6A, 6B and 6C, respectively.

Figure 8A:
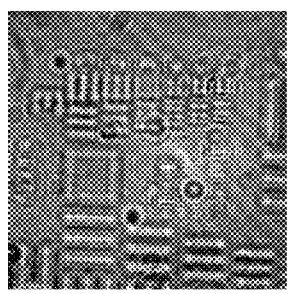
Figure 8B:
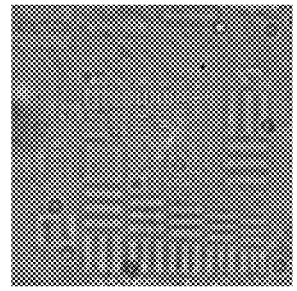

FIGS. 8A and 8B show images acquired using an experimental device similar to that shown in FIG. 5C.

Figure 9A:
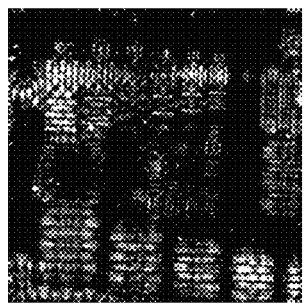
Figure 9B:
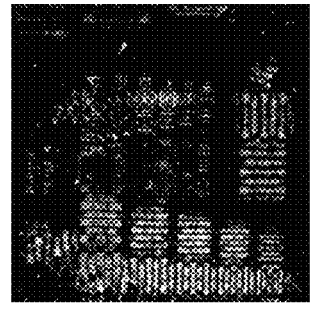

FIGS. 9A and 9B show images obtained by holographic reconstruction, on the basis of FIGS. 8A and 8B, respectively.

SUMMARY OF PARTICULAR EMBODIMENTS

FIG. 1A shows an example of a device 1 that is one subject of the invention, according to a first embodiment. A light source 11 is able to produce a light wave 12, called the emission light wave, that propagates in the direction of a holder 10s, along a propagation axis Z. The light wave 12 is emitted it at a least one wavelength $\lambda$. The holder 10s is able to hold an object 10 that it is desired to observe using a device 1. The holder allows the object 10 to be placed such that this object lies in a plane $P_{10}$, called the object plane.

The object 10 may be a sample that it is desired to characterize. It may comprise a solid or liquid medium 10a that is transparent or translucent to said wavelength $\lambda$, in which medium, or on the surface of which medium, particles 10b are dispersed. FIGS. 1B and 1C show examples of such objects. The particles 10b may be biological particles. The medium 10a may be a culture medium, or a bodily fluid. By biological particle, what is meant is a cell, such as a eukaryote cell, a bacterium or another microorganism, a fungus, a spore, a virus, etc. The term particles may also designate microbeads, for example metal microbeads, glass microbeads or organic microbeads, which are commonly implemented in biological protocols. It may also be a question of insoluble droplets submerged in a liquid medium, for example lipid droplets in an oil-in-water type emulsion. Thus, the term particles designates both endogenous particles, which are initially present in the examined object, and exogenous particles, which are added to this object before its observation. This term may also designate particles generated by aggregating other particles present in the sample, for example a complex formed by antibodies with elements bearing an antigen. Generally, each particle has a size that is advantageously smaller than 1 mm, or even smaller than 500 µm, and preferably a size comprised between 0.5 µm and 500 µm. Preferably, each particle has a size larger than the emission wavelength $\lambda$ of the light source, so as to cause a diffraction effect as described below. By particle size, what is meant is a diameter or a diagonal.

The expression "bodily fluid" is understood to mean a fluid issued from an animal or human body, such as blood, urine, sweat, cerebrospinal fluid, lymph, etc. The expression "culture medium" is understood to mean a medium that lends itself well to the development of a biological species such as cells, bacteria or other microorganisms.

The object may also be a tissue slide or anatomo-pathology slide including a small thickness of tissue deposited on a transparent slide. It may also be a question of a slide obtained by applying a staining protocol suitable for allowing a microorganism to be identified in a sample, for example a Gram or Giemsa stain. By small thickness, what is meant is a thickness that is preferably smaller than 100 µm, and more preferably smaller than 10 µm—typically a few micrometers.

The distance $\Delta$ between the light source 11 and the object 10 is preferably larger than 1 cm. It is preferably comprised between 2 and 30 cm. Preferably, the light source, seen by the object, may be considered to be point-like. This means that its diameter (or its diagonal) is preferably smaller than one tenth, and better still one hundredth of the distance between the object and the light source.

The light source may be a light-emitting diode or a source of laser light, such as a laser diode. It may preferably be a point source. In the example shown, the light source 11 is a light-emitting diode sold by Innovation Optics under the reference Lumibright 1700A-100-A-C0, the emission spectral band of which is centered on the wavelength of 450 nm. This light-emitting diode is placed facing a first end of an optical fiber 13, the second end of which is placed facing the object 10, or facing the holder 10s holding the object. The diameter of the core of the optical fiber is for example 1 mm. According to one variant, the optical fiber 13 may be replaced by a diaphragm, the aperture of which is typically comprised between 5 µm and 1 mm, and preferably between 50 µm and 500 µm—150 µm for example. According to another variant, the optical fiber is coupled to an objective, allowing an image of its distal end to be formed so as to improve the point-like character of the source. This particular case will be described below. The optical fiber or the diaphragm, which are optionally coupled to an objective, form a spatial filter 13 allowing a point light source to be formed when the light source 11 is not judged to be sufficiently point-like.

The device also includes an image sensor 20, which is able to form an image I in a detection plane $P_{20}$. In the example shown, it is a question of a matrix-array image sensor including a CCD or CMOS pixel matrix array. CMOS image sensors are preferred because the pixel size is smaller, this allowing images the spatial resolution of which is more favorable to be acquired. In this example, the image sensor is a CMOS sensor sold by Aptina under the reference Micron MT9P031. It is a question of a monochromatic CMOS sensor comprising 2592×1944 pixels of 2.2 µm side length, forming a detection surface, the area of which is 24.4 mm². Image sensors the inter-pixel pitch of which is smaller than 3 µm are preferred, in order to improve the spatial resolution of the image. The detection plane $P_{20}$ preferably lies perpendicular to the propagation axis Z of the emission light wave 12. The image sensor 20 may comprise a mirror-type system for redirecting images toward a pixel matrix array, in which case the detection plane corresponds to the plane in which the image-redirecting system lies. Generally, the detection plane $P_{20}$ corresponds to the plane in which an image is formed.

The distance d between the object 10 and the pixel matrix array of the image sensor 20 is, in this example, equal to 2 cm. Generally, whatever the embodiment, the distance d between the object and the pixels of the image sensor is preferably comprised between 50 µm and 5 cm.

The absence of magnifying optics between the image sensor 20 and the object 10 will be noted, this being the preferred configuration. This does not prevent focusing micro-lenses optionally being present level with each pixel of the image sensor 20, the latter not having the function of magnifying the image.

The device 1 includes an optical system 15 that is placed between the light source 11 and the object 10. Its function is to collect the emission wave 12 propagating toward the object and to form a convergent wave $12_c$ that propagates to the object, which wave is called the convergent incident wave. Some of the convergent incident wave $12_c$ is then transmitted by the object, forming a transmitted wave 22, and propagates to the image sensor 20. Moreover, under the effect of exposure to the convergent incident wave $12_c$, the object may generate a diffraction wave 23 resulting from diffraction, by the object, of the convergent incident wave $12_c$. The image sensor is therefore exposed to a wave, called the exposure wave 24, comprising the transmitted wave 22 and the diffraction wave 23. Detection of the exposure wave 24 by the image sensor allows an image of a portion of the object to be formed, this portion corresponding to the field of observation. This image represents a spatial distribution of the amplitude of the exposure wave 24 in the detection plane $P_{20}$. It may in particular include diffraction patterns resulting from interference between the transmitted wave 22 and the diffraction wave 23. These patterns may in particular take the form of a central core, around which concentric rings lie. It is a question of the diffraction patterns described in the section relating to the prior art.

When the object includes various particles 10b, the diffraction wave includes a plurality of elementary diffraction waves, each elementary diffraction wave resulting from diffraction of the convergent incident wave $12_c$ by said particles. Appearance of these diffraction waves is promoted when the size of the said particles is about the same as or larger than the wavelength A emitted by the light source 11.

The optical system 15 allows a secondary image $11_s$ of the source to be formed, above or below the object. The terms "above" and "below" are understood to mean along the propagation axis of the emission wave 12. Thus, by "below the object", what is meant is in a half space defined by the plane $P_{10}$ that passes through the holder able to hold the object 10 and that is perpendicular to the propagation axis Z, this half space including the image sensor 20 (and therefore not including the source 11). In the example shown in FIG. 1A, the secondary source $11_s$ is positioned below the image sensor 20, in the extension of the convergent incident wave $12_c$. It is therefore a question of a virtual source. By "below the sensor", what is meant is in a half space defined by the detection plane $P_{20}$ and not including the source 11.

In FIG. 1A, the positions of the object 10, of the image sensor 20 and of the secondary source $11_s$ are O, C and S, respectively. If $g_X$ is the transverse magnification of the object along an axis X that is perpendicular to the propagation axis Z, $$g_X = \frac{x_{20}}{x_{10}} = \frac{\overline{SO} + \overline{OC}}{\overline{SO}} \qquad (1)$$

where $x_{10}$ is a dimension in the object plane $P_{10}$;
$x_{20}$ is the same dimension in the detection plane $P_{20}$, i.e. in the image acquired by the image sensor; and
the operator designates the algebraic value.

The expression "transverse magnification" is understood to mean a magnification along an axis that is perpendicular to the propagation axis of the light. In the rest of the text, the terms transverse magnification and magnification are used interchangeably.

Figure 1:
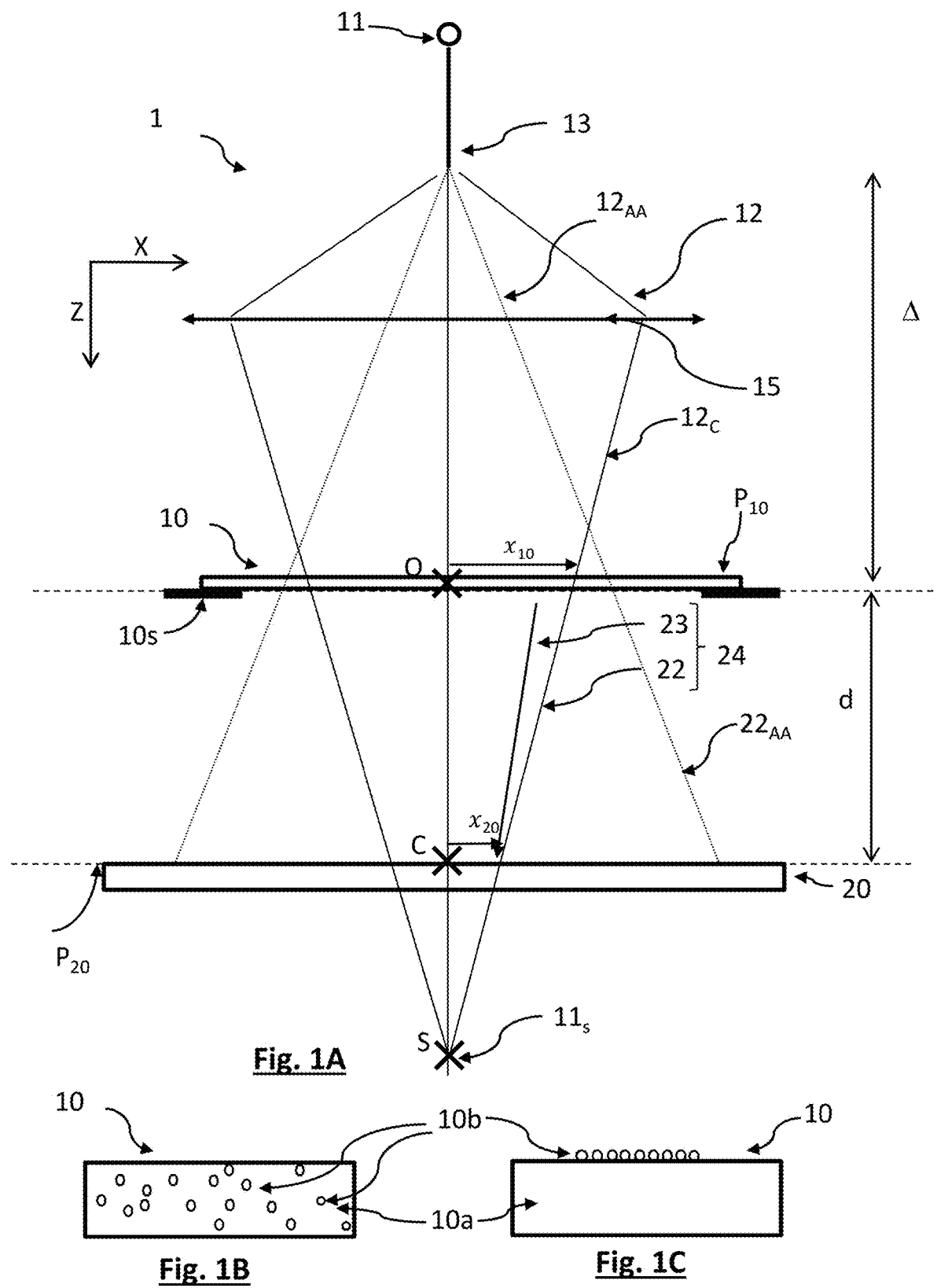
FIG. 1A shows a first embodiment of the invention.
FIGS. 1B and 1C show examples of objects capable of being observed by virtue of the invention.

In the configuration shown in FIG. 1, the transverse magnification is lower than 1. In other words, the dimensions of the imaged object are smaller in the detection plane $P_{20}$ than in the object plane $P_{10}$. It is therefore possible to take an image of an object the dimensions of which, in the object plane $P_{10}$, are larger than the dimensions of the image sensor 20. The further the secondary source $11_s$ is moved from the image sensor (from the object), the closer the magnification gets to 1 while remaining below 1, hence the notation $g_x \rightarrow 1^-$. When the secondary source $11_s$ is brought closer to the image sensor, the magnification tends to 0 while remaining positive: $g_x \rightarrow 0^+$. The term positive magnification designates the fact that there is no inversion between the image I formed on the image sensor 20 and the object 10.

An incident wave $12_{AA}$, according to the prior art is also shown in this figure. The incident wave is divergent from the light source to the object, from which a transmitted wave $22_{AA}$, which is also divergent, propagates to the image sensor 20. The transverse magnification is then higher than 1.

Figure 2:
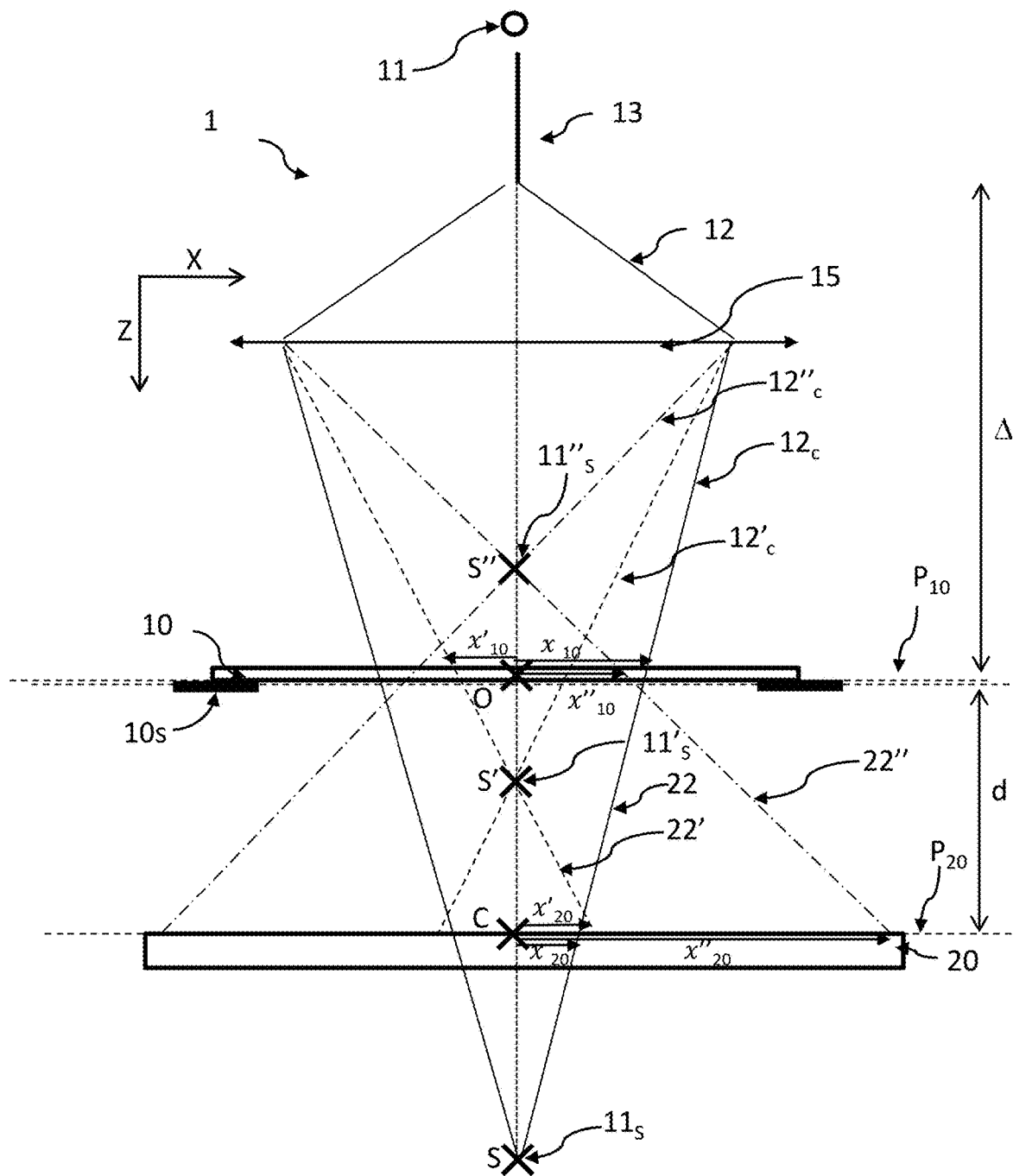
FIG. 2 show various embodiments of the invention.

FIG. 2 shows three configurations in which the secondary source $11_s$, $11'_s$, $11''_s$ occupies the positions S, S' and S", respectively. The position S of the secondary source $11_s$ is the position that was described above with reference to FIG. 1. For each of these positions, the following have also been shown:

the waves $12_c$, $12'_c$ and $12''_c$ incident on the object, which waves propagate between the optical system and the object, and the waves 22, 22', 22" transmitted by the object, which waves propagate to the image sensor 20;

a transverse dimension $x_{10}$, $x'_{10}$, $x''_{10}$ of the object in the object plane $P_{10}$; and said transverse dimension $x_{20}$, $x'_{20}$, $x''_{20}$ of the object in the object plane $P_{20}$.

On the basis of Expression (1), it is possible to determine the transverse magnification of each of these configurations.

When the secondary source is positioned between the image sensor 20 and the object 10, which position is referenced S' in FIG. 2, the magnification is negative. The negative value of the magnification indicates an inversion of the object in the image. The magnification tends toward 0 as the secondary source is brought closer to the image sensor and tends toward $-\infty$ as the secondary source is brought closer to the object. The case where the secondary source is located between the sensor 20 and the object 10, at equal distance from each other, corresponds to a configuration in which $\overline{S'O}=\overline{OC}$ and therefore $g_x=-1$.

When the secondary source is positioned between the optical system 15 and the object 10, which position is referenced S" in FIG. 2, the magnification is positive, and higher than 1: it tends toward $+\infty$ as the secondary source is brought closer to the object and tends toward 1 as the secondary source is moved further from the object. The configuration is then similar to the prior-art configuration. In this case, the incident wave $12''_c$ reaching the object is divergent.

Figures 3, 4A, 4B, 4C, 4D, 4E:
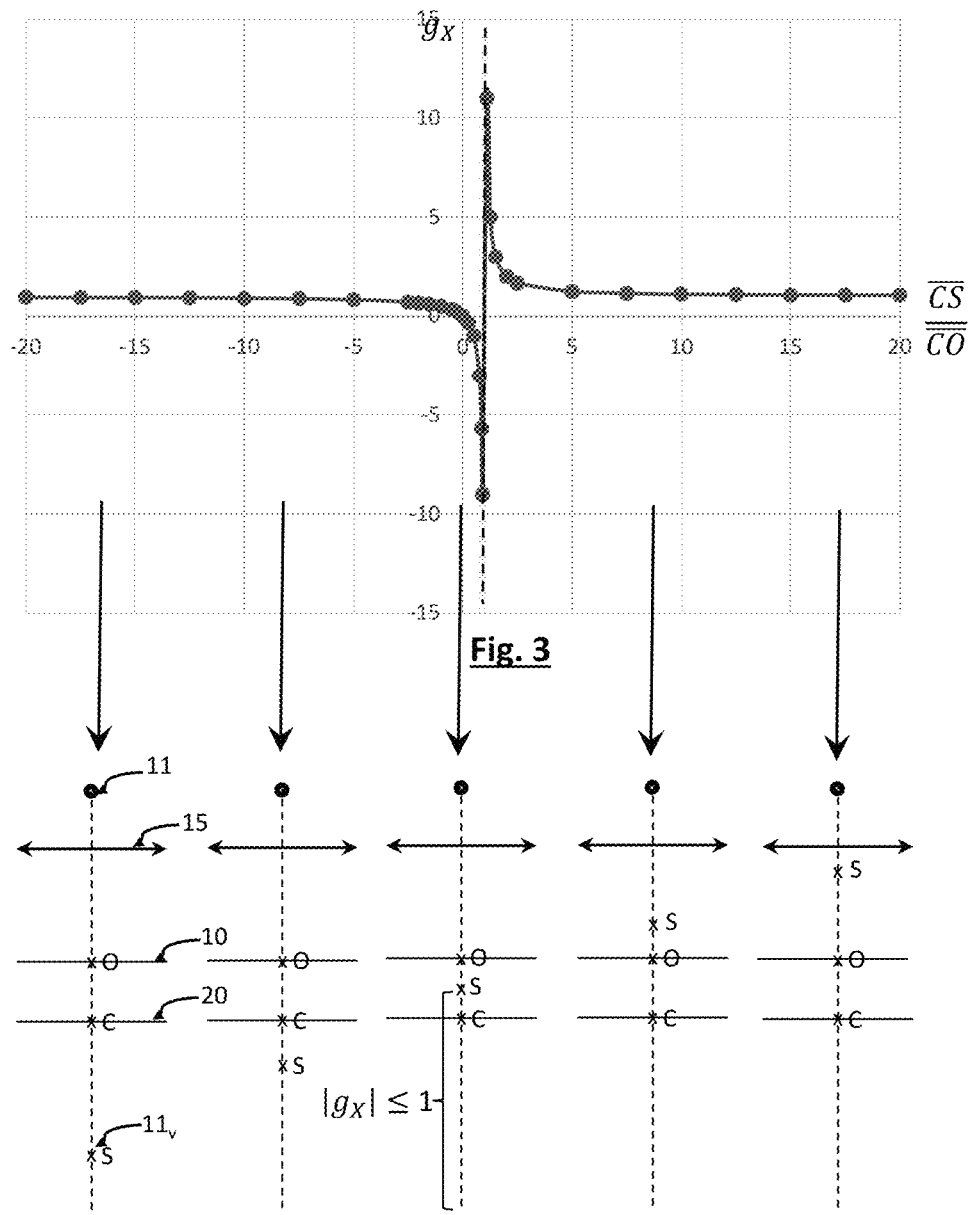
FIG. 3 shows the variation in the magnification generated by the device as a function of the position of the secondary source with respect to the object.
FIGS. 4A to 4E illustrate certain configurations that are commented upon in the description with reference to FIG. 3.

FIG. 3 shows the variation in the transverse magnification as a function of the position S of the secondary source, along the propagation axis of the incident wave. In this figure, the x-axis represents the ratio $$\frac{\overline{CS}}{\overline{CO}}$$

and the y-axis represents the transverse magnification. It may be seen that:

i) when the secondary source $11_s$ is located closer to the image sensor 20 than to the object 10, $$\left(\frac{\overline{CS}}{\overline{CO}}<\frac{1}{2}\right),$$

the absolute value of the magnification $g_x$ is strictly lower than 1: $|g_x|<1$; the magnification is negative when the secondary source is placed between the image sensor 20 and the object 10, and positive when the secondary source is located below the image sensor;

ii) when the secondary source $11_s$ is placed closer to the object 10 than to the image sensor 20, $$\left(\frac{\overline{CS}}{\overline{CO}}>\frac{1}{2}\right),$$

the absolute value of the magnification $g_x$ is strictly higher than 1: $|g_x|>1$;

iii) when the secondary source $11_s$ is placed between the object and the image sensor, $$\left(0<\frac{\overline{CS}}{\overline{CO}}<1\right),$$

the magnification $g_x$ is negative, this corresponding to an inversion of the image of the object;

iv) when the secondary source $11_s$ is placed below the image sensor, i.e. in a half space defined by the detection plane $P_{20}$ and not containing the object 10 (or the source 11), $$\left(\frac{\overline{CS}}{\overline{CO}}<0\right),$$

the magnification $g_x$ is strictly comprised between 0 and 1: $0<g_x<1$; and v) when the secondary source $11_s$ is placed between the source 11 and the object 10

$$\left(\frac{\overline{CS}}{\overline{CO}}>1\right),$$

the magnification is strictly higher than 1.

The configuration in which the secondary source is in the object plane, i.e.

$$\frac{\overline{CS}}{\overline{CO}}=1$$

corresponds to a configuration in which the magnification is infinity. However, in this configuration, that portion of the object which is illuminated by the convergent incident wave $12_c$ is then infinitely small, and hence this configuration is of no interest. When the secondary source is brought closer to the object, the magnification tends toward:

$-\infty$ if the secondary source is located below the object, i.e.

$$\frac{\overline{CS}}{\overline{CO}}\to 1^-;$$

$+\infty$ if the secondary source is located above the object, i.e.

$$\frac{\overline{CS}}{\overline{CO}}\to 1^+;$$

The configuration in which the secondary source $11_s$ is in the detection plane $P_{20}$ i.e.

$$\frac{\overline{CS}}{\overline{CO}} = 0$$

corresponds to a configuration in which the magnification is zero. This configuration is of no interest.

FIGS. 4A to 4E show configurations associated with particular portions of the curve of FIG. 3:
  FIGS. 4A and 4B show two configurations in which the magnification is positive and lower than 1, the magnification tending toward 1 as the secondary source $11_s$ is moved further from the image sensor 20;
  FIG. 4C shows the limiting case in which the magnification is equal to −1, the secondary source $11_s$ being located at equal distance from the object 10 and from the image sensor 20:

$$\frac{\overline{CS}}{\overline{CO}} = \frac{1}{2};$$

and
  FIGS. 4D and 4E show two configurations in which the magnification is positive, and tends toward 1 as the secondary source $11_s$ is moved further from the object 10.

Thus, a magnification the absolute value of which is lower than 1 is obtained in configurations i) or iv). This is due to the fact that the wave $12_c$ incident on the object 10 is convergent, and that the secondary source $11_s$ is closer to the image sensor 20 than to the object 10. In this type of configuration, provided that the illuminated field on the object is sufficiently large, the field of observation of the image sensor is increased with respect to the prior art. The curly bracket shown in FIG. 4C indicates the range of positions of the secondary source corresponding to this particular case.

Moreover, by interposing an optical system 15 between the light source 11 and the object 10, it is possible to make the position of the secondary light source $11_s$ vary, for example using an optical system 15 of variable focal length or by moving said system. The magnification $g_x$ may be modulated depending on a parameter characterizing the optical system 15, for example its focal length or its position along the propagation axis Z. This allows, during observation of an object, images corresponding to a magnification lower than 1, and hence to a large field of observation, to be alternated with images corresponding to a magnification higher than 1, allowing, via a zoom effect, details to be better seen. Although the device does not include any magnifying optics between the source and the object, the invention allows the magnification of an image to be modulated.

The image obtained on the image sensor 20 may be exploited as such. Specifically, it has been shown that certain particles produce diffraction patterns the morphology of which is specific thereto. It is thus possible to count particles, and to identify them, as described in document WO2008090330, which was cited in the section relating to the prior art. As a variant, a reconstruction algorithm may be applied to this image so as to obtain a reconstructed image in a plane parallel to the detection plane $P_{20}$, called the reconstruction plane $P_r$, this plane being located at a known distance $d_r$ from the detection plane. It is then a question of using the well-known principles of digital holographic reconstruction, which principles are for example described in the publication Ryle et al, "Digital in-line holography of biological specimens", Proc. OF SPIE Vol. 6311 (2006), to calculate the product of convolution between the image intensity I(x,y) measured by each pixel $20_{(x,y)}$ of the image sensor 20 and a propagation operator h(x,y,z). The function of the propagation operator h(x,y,z) is to describe the propagation of light between the image sensor 20 and a point of coordinates (x,y,z). The coordinates (x, y) are coordinates in the detection plane $P_{20}$, whereas the coordinate z is a coordinate along the propagation axis Z. It is possible to reconstruct a complex expression I*(x,y,z) for the exposure wave 24 at every point of spatial coordinates (x,y,z) and in particular in a plane located at a reconstruction distance $d_r$ from the image sensor, i.e. a plane of equation $z=d_r$. It is then possible to determine the amplitude u(x,y,z) and phase $\varphi$(x,y,z) of this exposure wave 24 at the reconstruction distance $d_r$, with:
  u(x,y,z)=abs [I*(x,y,z=$d_r$)]; and
  $\varphi$(x,y,z)=arg [I*(x,y,z=$d_r$)],
abs and arg respectively designating the modulus and argument operators.

In this example, the detection plane $P_{20}$ in which the image I is formed is assigned a coordinate z=0. The propagation operator may be such that:

$$h(x, y, z) = \frac{z}{2\pi r}\left(1 - j2\pi \frac{r}{\lambda}\right)\frac{e^{\left(j2\pi\frac{r}{\lambda}\right)}}{r^2}, \quad (2)$$

where $r=\sqrt{x^2+y^2+z^2}$, and $\lambda$ is the wavelength.

Such an operator was described in the publication Marathay A "On the usual approximation used in the Rayleigh-Sommerfeld diffraction theory", J. Opt. Soc. Am. A, Vol. 21, No. 4, April 2004. Other propagation operators are usable, for example an operator based on the Fresnel-Helmholtz function, such that:

$$h(x, y, z) = \frac{1}{j\lambda z}e^{j2\pi\frac{z}{\lambda}}\exp\left(j\pi\frac{(x+y)^2}{\lambda z}\right). \quad (2')$$

Experimental Trials

Experimental trials have been carried out using a configuration such as shown in FIGS. 5A and 5B. The light source 11 was coupled to an optical fiber 13, a proximal end of which was placed facing the point source and a distal end of which formed a point light source. This distal end was placed at a large distance, so as to be able to be considered to be placed at the infinity of an objective 13' able to form, at its focal point, a reduced image of the distal end of the optical fiber. By large distance, what is meant here is at least 10 times, or even 100 times the focal length of the objective. In this example, the objective 13' was a 40× EF-N Plan Motic® objective of 0.65 numerical aperture and of focal length $f_1$=4.6 mm. The association of the optical fiber and the objective formed a spatial filter allowing a point light source 11' to be formed at the focal point of the objective 13. Alternatively, a diaphragm could have been used instead of the optical fiber or instead of the optical-fiber+objective assembly.

The device included an optical system 15 that was placed between the light source 11 and the object 10: it was a question of a tube lens of 50 mm focal length (reference AC254-050-A, manufacturer Thorlabs). This system was able to conjugate the light source 11 with a secondary source 11$_s$, via the point source 11'. This optical system was arranged such that the secondary source 11$_s$ was positioned between the object 10 and the image sensor 20, as shown in FIG. 5A.

The distance d$_{15}$ between the optical system 15 and the objective 13' was varied, this distance being called the inter-optic distance, so as to move the position S of the secondary source 11$_s$ along the propagation axis Z of the light. The object 10 included a transparent reticle, which is shown in FIG. 5B, comprising opaque graduations that were spaced apart from one another by a distance equal to 100 μm. The object 10 was placed at a distance of 2 cm from the detection plane P$_{20}$ of the CMOS image sensor 20, which was described above. FIGS. 6A, 6B and 6C show images obtained on the image sensor. Each image includes patterns, called diffraction patterns, resulting from interference between a diffraction wave 23, produced by diffracting elements of the object, and the wave 22 transmitted by the object. The diffracting elements of the object may for example be the opaque graduations of the reticle. Thus, as described above, the image sensor 20 was exposed to an exposure wave 24, including the wave 22 transmitted by the object and a wave 23 resulting from the diffraction, by the object, of the convergent wave 12$_c$ incident on the object. The images 6A, 6B and 6C show a spatial distribution of the amplitude of the exposure wave 24 in the detection plane P$_{20}$.

Holographic reconstruction algorithms were applied to each of the images 6A, 6B and 6C. The holographic reconstruction algorithm implemented was based on the operator described by Expression (2), the reconstruction distance employed being z=−2 cm, the coordinate z=0 corresponding to the detection plane P$_{20}$. FIGS. 7A, 7B and 7C show the results of the reconstructions obtained on the basis of the images 6A, 6B and 6C, respectively. The reconstruction algorithms did not take into account the magnification induced by the optical system 15. Specifically, they were based on the assumption of a propagation of a plane wave, propagating parallel to the propagation axis. Thus, the reconstructed images had the same magnification as the images obtained in the detection plane. It will be noted that the graduations may clearly be seen in the reconstructed images, this attesting to the high quality of the reconstruction.

Since the distance between two adjacent pixels was known, it was then possible to measure the transverse magnification generated by the optical system using the expression:

$$g_X = \frac{\delta_{pix} \times n_{pix}}{\delta}, \quad (3)$$

where:
- δ is the distance between a preset number, here equal to 10, of successive graduations of the reticle;
- δ$_{pix}$ is the distance between two adjacent pixels of the image sensor 20; and
- n$_{pix}$ is the number of pixels between said preset number of successive graduations in the reconstructed image.

FIGS. 6A and 7A correspond to an inter-optic distance of zero, the optical system 15 being placed against the objective 13'. The secondary source 11$s$ is then located, between the object and the image sensor, at a distance of 12.6 mm from the image sensor and at a distance of 7.4 mm from the object, and therefore closer to the object than to the sensor. The magnification is negative and higher than 1. It's estimation according to Expression (3) indicates g$_X$=−1.7.

FIGS. 6B and 7B correspond to an inter-optic distance of 29.7 mm. The secondary source 11$s$ is then located between the object 10 and the image sensor 20, at equal distance from both. It is then in a configuration such as shown in FIG. 4C. The magnification is negative, and its absolute value is equal to 1. In other words, g$_X$=−1.

FIGS. 6C and 7C correspond to an inter-optic distance of 120 mm. The secondary source 11$s$ is then located between the object 10 and the image sensor 20, at a distance of 7.2 mm from the image sensor and therefore closer to the image sensor than to the object. The magnification is negative, and its absolute value was estimated to be −0.57.

These trials demonstrated the ability of the device to obtain an exploitable image of an object the size of which is larger than the size of the sensor, because of a magnification the absolute value of which is lower than 1. They also demonstrated that it is possible to easily modulate the position of the secondary source 11$s$ and, therefore, to pass from a magnification of higher than 1 to a magnification lower than 1, without modifying the position of the source, of the object and of the image sensor, and to do so with no magnifying optics placed between the object and the image sensor. Thus, while remaining within the field of lensless imaging, the magnification of the image of the object may be lower than 1, and may vary.

In another trial, the device of which is shown in FIG. 5C, the lens 15 was replaced with an Optotune® variable-focal-length lens (reference EL-10-30-VIS-LD). The focal length of such a lens may be controlled by application of an electrical current. The reticle was replaced with a reticle the graduations of which were not opaque, but formed of trenches etched by laser etching. Each graduation formed what is called a "phase" object that caused the convergent wave 12$_c$ incident on the object to diffract. The lens was arranged such that the secondary source 11$s$ was positioned below the image sensor 20.

FIGS. 8A and 8B respectively show images obtained:
- when the current was zero: the magnification was positive, the secondary source 11$s$ being located below the sensor, at a distance of 21.8 mm from the latter; and
- when the current was 292 mA: the magnification was positive, the secondary source 11$s$ being located below the image sensor, at a distance of 12.2 mm from the latter.

FIGS. 9A and 9B show images reconstructed from FIGS. 8A and 8B, respectively, in the object plane, i.e. using a reconstruction distance of 2 cm. It is possible to estimate the magnification in each of these configurations, said magnification being estimated from FIGS. 9A and 9B to be 0.52 and 0.38, respectively. These trials illustrate the configurations shown in FIGS. 4A and 4B, and confirm the fact that the closer the secondary source is brought to the image sensor, the lower the magnification becomes.

This once again demonstrates that it is possible to modulate the magnification of an image in a lensless-imaging type configuration, i.e. without magnifying optics placed between the object and the sensor.

The invention will possibly be used to observe samples, for example biological samples, or in other fields, for example the field of the food-processing industry.

The invention claimed is:

1. A device for observing an object, comprising:
a light source, configured to generate an emission light wave, that propagates along a propagation axis;
an image sensor;
a holder configured to hold an object, the holder being placed between the image sensor and the light source such that the image sensor is configured to form an image of the object held on the holder; and
an optical system, entirely placed between the light source and the holder, the optical system configured to form, from the emission light wave, a convergent incident light wave that propagates from the optical system to the holder; wherein:
the holder defines an object plane, that is perpendicular to the propagation axis and that passes through the holder, the optical system being configured to conjugate the light source with a secondary point that is located in a half space defined by the object plane and that includes the image sensor, the secondary point being positioned at a convergence of the convergent incident light wave;
the optical system is configured such that the secondary point is located closer to the image sensor than to the holder, such that the image of the object on the image sensor is affected by a magnification lower than 1.

2. The device of claim 1, wherein the device does not comprise magnifying optics between the holder and the image sensor.

3. The device of claim 1, wherein the optical system is configured such that the secondary point is located between the holder and the image sensor.

4. The device of claim 1, wherein the image sensor lies in a detection plane, the optical system being configured such that the secondary point is located in a half space that is defined by the detection plane and that does not include the light source.

5. The device of claim 1, wherein the optical system is parameterized by a parameter, such that the position of the secondary point is adjustable depending on the parameter.

6. The device of claim 5, wherein the parameter is a position of the optical system along the propagation axis or a focal length of the optical system.

7. The device of claim 1, wherein the object includes one or more biological particles.

8. A method for observing an object comprising:
placing the object between a light source and an image sensor, the light source being coupled to an optical system that is entirely placed between the light source and the object;
activating the light source, the light source then emitting an emission light wave that propagates to the optical system, the optical system forming a convergent incident light wave that propagates to the object; and
acquiring, using the image sensor, an image of the object thus exposed to the convergent incident light wave; wherein:
the emission light wave is emitted along a propagation axis, the object defining an object plane, that passes through the object and that is perpendicular to the propagation axis, such that, during the activating the light source, the optical system conjugates the light source with a secondary point, the secondary point being located in a half space that is defined by the object plane and that includes the image sensor, the secondary point being positioned at a convergence of the convergent incident light wave; and
the secondary point is located closer to the image sensor than to the object so that the image of the object on the image sensor is affected by a magnification lower than 1.

9. The method of claim 8, wherein no magnifying optics are placed between the object and the image sensor.

10. The method of claim 8, wherein the secondary point is located between the object and the image sensor.

11. The method of claim 8, wherein the image sensor lies in a detection plane, and wherein the secondary point is located in a half space that is defined by the detection plane and that does not include the light source.

12. The method of claim 8, wherein the activating the light source further comprises adjusting the position of the secondary point depending on a parameter of the optical system.

13. The method of claim 12, wherein the parameter of the optical system is:
a focal length of the optical system; or
a position of the optical system along the propagation axis.

14. The method of claim 8, wherein, in the acquiring the image of the object, the image sensor is exposed to an exposure light wave including:
a wave that is transmitted by the object and that results from a transmission, by the object, of the convergent incident light wave; and
a diffraction wave that results from diffraction, by the object, of the convergent incident light wave.

15. The method of claim 8, further comprising:
applying a holographic reconstruction algorithm to the image formed on the image sensor in the acquiring the image of the object.

16. The method of claim 15, wherein the holographic reconstruction algorithm performs at least one of identifying one or more particles in the object or counting the one or more particles in the object.

17. The method of claim 8, wherein:
the light source emits the emission light wave at a wavelength;
the object is translucent or transparent at the wavelength.

18. The method of claim 8, wherein:
the light source emits the emission light wave at a wavelength;
the object includes particles that are dispersed in or on a surface of a medium, the medium being translucent or transparent at the wavelength.

* * * * *